Jan. 20, 1942. H. J. SCHNEIDER ET AL 2,270,742
FLUID PRESSURE ACTUATING MECHANISM
Filed Dec. 3, 1940 3 Sheets-Sheet 1
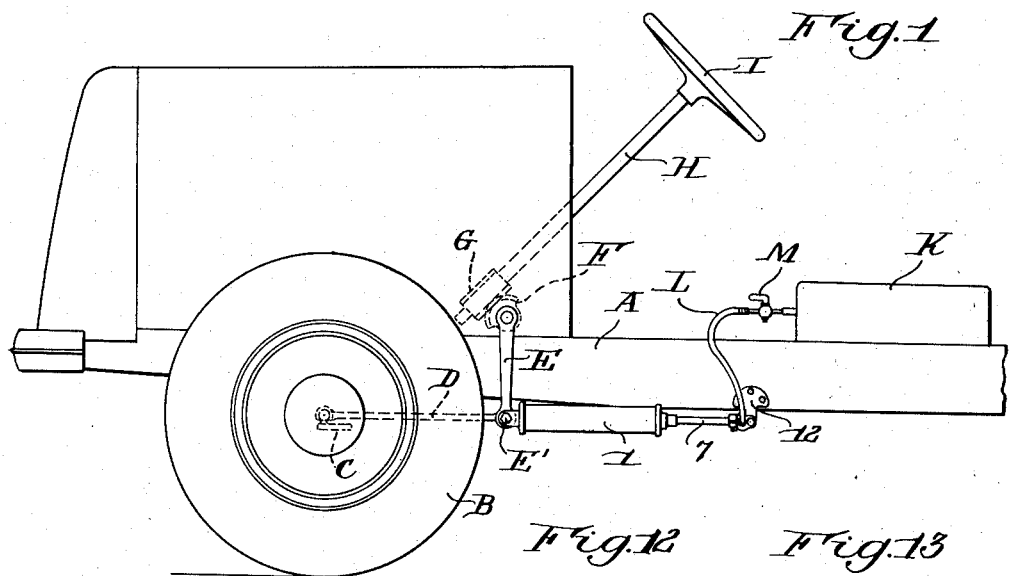
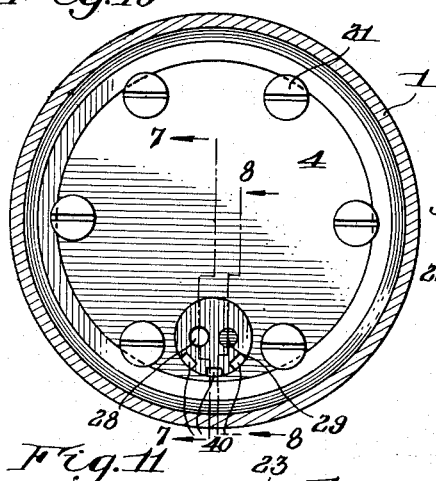
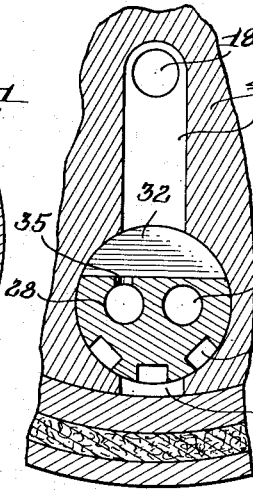
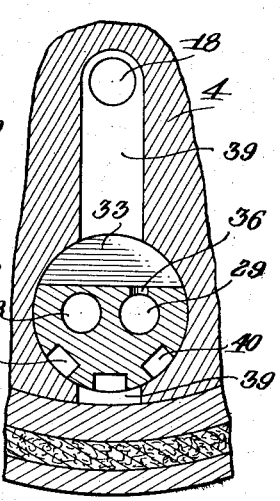
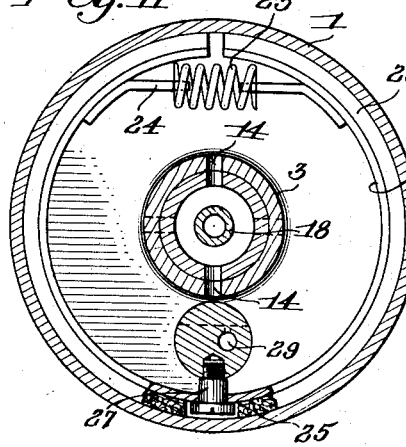
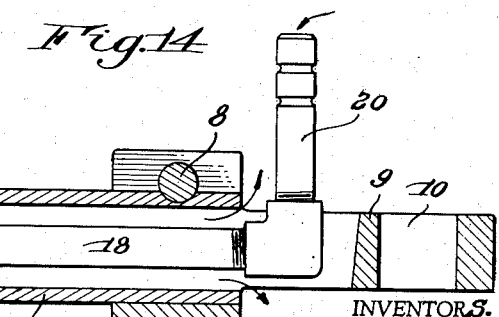
INVENTORS.
Henry J. Schneider
Leon G. Simpson
BY
their Attorney Jan. 20, 1942.  H. J. SCHNEIDER ET AL  2,270,742
FLUID PRESSURE ACTUATING MECHANISM
Filed Dec. 3, 1940  3 Sheets-Sheet 2
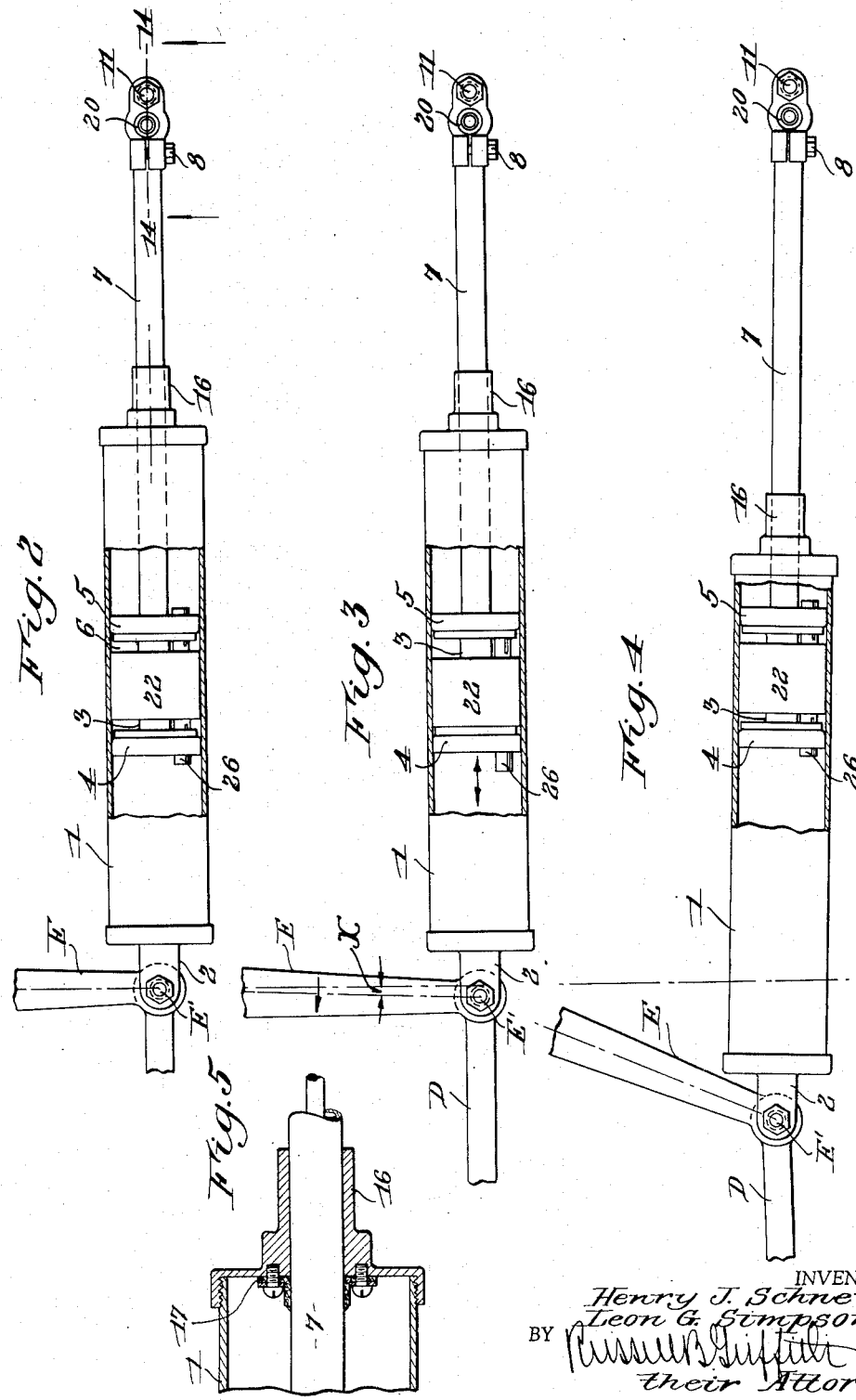
INVENTORS.
Henry J. Schneider
Leon G. Simpson
BY
their Attorney Jan. 20, 1942.  H. J. SCHNEIDER ET AL  2,270,742
FLUID PRESSURE ACTUATING MECHANISM
Filed Dec. 3, 1940  3 Sheets-Sheet 3
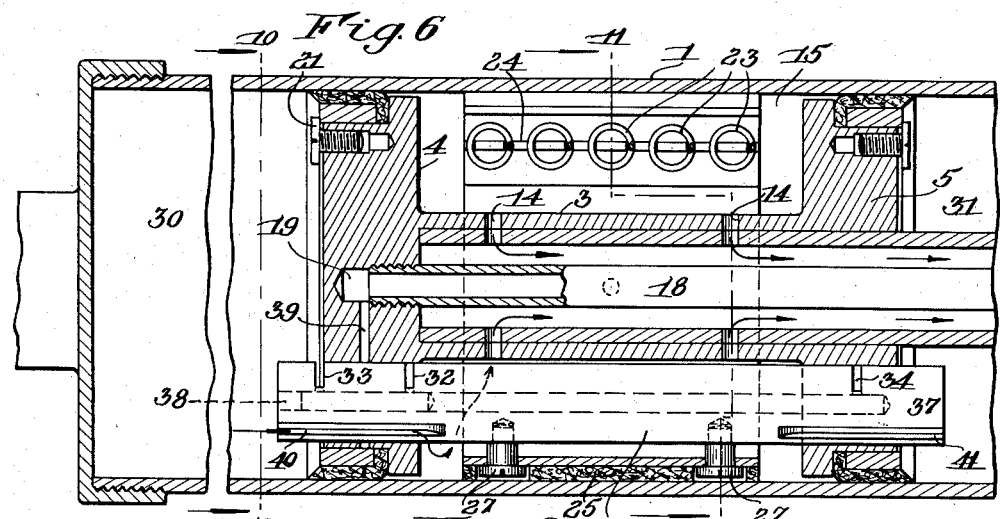
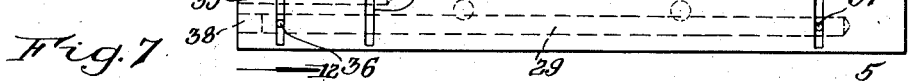
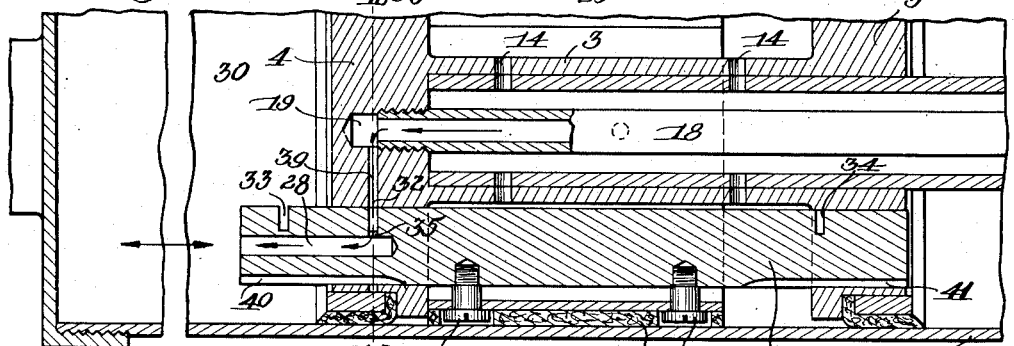
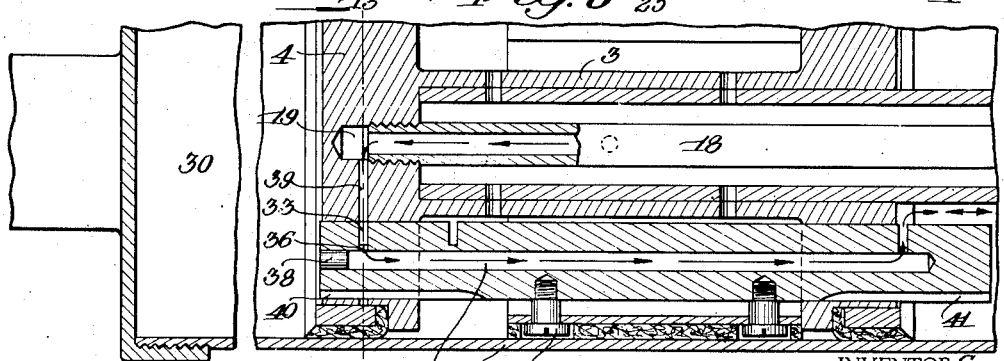
INVENTORS.
Henry J. Schneider
Leon G. Simpson
BY
Their Attorney Patented Jan. 20, 1942

2,270,742

UNITED STATES PATENT OFFICE 2,270,742

FLUID PRESSURE ACTUATING MECHANISM

Henry J. Schneider and Leon G. Simpson, Rochester, N. Y., assignors to Schneider Lamont, Inc., Rochester, N. Y., a corporation of New York Application December 3, 1940, Serial No. 368,368

11 Claims. (Cl. 121—38)

Our present invention relates to fluid pressure actuators of a type in which a preliminary manual operation sets the actuator in motion and an opposite movement of the manual device stalls and ultimately reverses the action of said actuator. A device of this nature can be applied to various mechanical problems, but they are particularly applicable to the steering gears of automotive vehicles in attachment with which they have the effect of applying what is called "boosting" pressure on the steering gear of the vehicle and thereby reducing the aforesaid manual effort in turning the ground wheels to a minimum. It is in such an environment that we choose to describe our invention and we have so illustrated an embodiment thereof, it being borne in mind, nevertheless, that there are certain features of the invention that are particularly applicable in connection with steering gears per se.

An object of the invention is to provide a device of this general nature that will be sensitive to control, powerful in its effect and simple both in construction and its application to either existing vehicles and as a matter of standard equipment to the steering mechanisms of vehicles specially designed for cooperation therewith.

To these and other ends, the invention resides in certain improvements and combination of parts, all as will be hereinafter more fully described, the novel features being pointed out in the claims at the end of this specification.

In the drawings:

Figure 1 is a side elevation of a portion of the chassis of a motor vehicle with a device constructed in accordance with and constituting one embodiment of our invention applied to the steering mechanism thereof;

Figure 2 is an enlarged side elevation partly in longitudinal central section through the cylinder case only of the actuator and connected parts in normal (neutral) positions;

Figure 3 is a view similar to Figure 2 showing the positions of the parts when the manually operated steering gear of Figure 1 is brought into use to turn the wheels of the vehicle in one direction, namely, to the right;

Figure 4 is a view similar to Figures 2 and 3, showing what happens when the fluid pressure actuator picks up the movement of the steering column and carries on, without further effort by the driver, in the turning of the wheels by such fluid pressure;

Figure 5 is a further enlarged detail in longitudinal, central section through the rear cylinder head and adjacent parts;

Figure 6 is a still further enlarged, fragmentary, central, vertical section through the front end of the cylinder, the piston, and adjacent parts, all parts being in positions corresponding to that of Figure 2;

Figure 7 is a view similar to Figure 6 with the parts corresponding to the positions shown in Figure 3, the section being on the line 7—7 of Figure 10;

Figure 8 is a view similar to Figures 6 and 7 not corresponding, by the way, to positions of the parts in Figure 4, but showing the positions of the parts when a reverse movement of the manually operated steering column is made to turn the wheels in the opposite direction, namely, to the left, the section being on the line 8—8 of Figure 10;

Figure 9 (on the same sheet with Figures 6, 7 and 8) is a plan view of the reversible valve member showing the port arrangements thereof;

Figure 10 is a transverse section taken in a plane indicated by the line 10—10 of Figure 6, looking in the direction of the arrows;

Figure 11 is a transverse section in a plane taken on the line 11—11 of Figure 6, looking in the direction of the arrows thereon indicated;

Figure 12 is a greatly enlarged transverse fragmentary section through the forward piston head and the valve member taken on the line 12—12 of Figure 7, looking in the direction of the arrows;

Figure 13 is a similar view but taken on the line 13—13 of Figure 8, also looking in the direction of the arrows, and Figure 14 is a greatly enlarged, horizontal section of the piston rod bearing on its wrist pin taken on the line 14—14 of Figure 2, looking in the direction of the arrows.

Similar reference numerals throughout the several views indicate the same parts.

To first give a general idea of the construction and mode of operation of our invention with particular reference to its illustrated embodiment, the fluid pressure or pneumatic couple comprises a relatively fixed piston and a movable cylinder. The latter is connected to an operating element of the steering gear of the vehicle, while the piston rod is connected to react against a fixed part of the chassis. The piston has two piston heads and an intervening chamber through all three of which passes a reciprocatory valve member provided with a system of ports. The piston rod is hollow, open to the atmosphere and always open to the piston chamber as an exhaust means therefrom. Through the hollow piston to one of the heads extends a pressure supply conduit communicating through a suitable port with the bearing of and ports in the valve member. The latter has additional exhaust ports establishing communication alternatively between the piston chamber and one of the pressure chambers constituted by the respective piston heads and the adjacent cylinder heads. The valve member is fixed to a floating valve carrier located in the piston chamber and sliding with frictional pressure on the walls of the cylinder so that it will either seize and move with the cylinder when the latter is moved or be dislodged and slide relatively to the cylinder under impulse from a certain pressure communicated to the valve member that it carries. In other words, the cylinder, through the carrier, moves the valve member slightly in one direction and the valve is returned by the pressure it builds up and of course slides the carrier with it. The valve arrangements are such that when movement of the cylinder is initiated by manual operation of the steering gear of the vehicle in the usual manner, the valve carrier will move slightly along with it, actuate the valve member and thereby admit pressure to the appropriate cylinder head and pressure chamber to powerfully supplement the manual operation and actuate the steering gear as desired. As soon as sufficient pressure is built up in the pressure chamber and the steering wheel is held or slightly reversed, the carrier sleeve and valve are returned by the tendency of that pressure against the latter, whereupon the pressure chamber is exhausted into the piston chamber and thence through the hollow connecting rod to the atmosphere. The same thing occurs in reverse through the pressure chamber at the other end of the cylinder when the manually operated gearing is similarly manipulated.

Referring more particularly to the drawings and first to Figures 1 to 4 thereof, the vehicular environment of the device will be readily recognized by those skilled in the art and has been therefore rather conventionally shown to include a chassis frame A with front steering ground wheels B and radius mechanism C connected by a thrust rod D with the swinging pitman E at the pin E'. The segment F of the latter meshes with a worm G on steering post H having a hand wheel I. A forward swing of the pitman E swings the steering ground wheels for a right-hand turn and vice versa. Carried on the chassis is a fluid pressure (preferably air) tank or source K connected by a pipe L with our actuating device as hereinafter later described.

The forward head of the cylinder 1 is pivoted at 2 on the pitman pin E'. The piston therein is indicated generally at 3 comprising the opposite heads 4 and 5 with an intervening annular exhaust chamber 6 formed therebetween.

The piston rod 7, as aforesaid, is hollow and extends from the forward piston head through the piston and rear head and through the rear cylinder head of course, the latter being provided with an extended bearing 16 and suitable stuffing 17 as shown in detail in Figure 5. At its rear end it is clamped by the split collar 8 thereof to a bearing fitting 9 having a bearing 10 engaging a wrist pin 11 on a fixed bracket 12 on the chassis A. This fitting has an opening 13 through which, as indicated by the arrows, the hollow piston rod exhausts to the atmosphere. At its inner or forward end, it is similarly in constant exhausting communication through open ports 14 with piston chamber 15 (Figure 6).

Extending through the hollow piston rod is a similarly tubular pressure supply conduit or pipe 18 threaded into a recess 19 in the forward cylinder head 4. Its rear end with suitable fittings passes out through opening 13 in bearing fitting 9 close to the wrist pin center and terminates in a suitable laterally disposed nipple 20 to which is attached the previously described pressure supply pipe L.

The piston heads 4 and 5 are, of course, provided with suitable packing rings, detachably held in place by the screws 17.

The valve carrier beforementioned occupies the piston chamber 15 and, referring more particularly to Figures 6 and 11, comprises essentially a split sleeve 22 surrounding the central reduced portion of the piston 3 but not greatly obstructing piston chamber 15 with regard to which latter it is of lesser length so that it has a limited sliding play with reference thereto in both directions. The carrier sleeve is caused to frictionally hug or normally seize the walls of the cylinder 1 under the influence of a plurality of expanding springs 23 carried by centering devices 24 on the interior near the split line thereof. Its periphery is covered with a frictional packing 25 of somewhat the nature of a brake lining so that while it slides in the cylinder it tends to move therewith in either direction under the influence of pitman E until it engages in the end of chamber 15 and is stopped thereby. It is also so moved relatively to the cylinder and the chamber 15 by the valve member under the pressure influence hereinafter described.

Extending through slide bearings in both piston heads 4 and 5 and the chamber 15 at a point offset from the center is a valve member 26 that is carried by the sleeve 22, being fixed to the latter, in the present instance, by screws 27 (Figures 6 and 11). It is longer than the piston and, in the normal or neutral positions of Figures 2 and 6, projects from both heads thereof, namely, into the pressure chambers 30 and 31 formed respectively by the piston head 4 and the forward end of the cylinder and the piston head 5 and the rear cylinder head. This valve member is preferably cylindrical and has two longitudinal bores 28 and 29 drilled therein, shown also in dotted lines in Figure 9, which figure is now also to be observed. They are both intersected at the forward end by transverse, longitudinally spaced slots 32 and 33, and the longer bore which extends almost to the opposite end is intersected by a similar transverse slot 34. These slots, which in reality are extensions thereof, have vertical ports 35 and 36 and 37 drilled from the bottoms down to respectively open into the forward end of long bore 29, the rear end of short bore 28 and the rear end of long bore 29. The bore 29 is plugged at its front end, as indicated at 38, so that it leads only to port 37 and slot 34 at the rear. Bore 28 opens at all times beyond piston head 4 into pressure chamber 30. A port 39 leads downwardly from pressure supply chamber 19 and pressure conduit 18 to the bearing in which the valve member slides in piston head 4. The amplitude of movement of the valve member and its carrier sleeve is such that either slot 32 or slot 33 may be brought into register with this port 39. On an extreme rearward movement of the valve member, slot 34 and its port 37 open into rear pressure chamber 31.

Cut in the periphery of the valve member at each end and open to the bearings in the piston heads in which it slides, are a plurality of longitudinal grooves or channels 40 and 41. These are sufficiently long so that in the normal or neutral positions of Figure 6 they will be uncovered at their inner ends as well as at their normally open outer ends and serve as exhaust ports or by-passes for relieving the pressure in the respective pressure chambers 30 and 31 and communicating it to the piston chamber 15 and thence out through the hollow piston rod.

The operation of the device is as follows:

Assume that the parts are in the normal positions of Figures 1, 2 and 6, that is, with the vehicle traveling straight ahead, the piston 3 at the center of cylinder 1 and the valve carrier 22 centrally of the piston chamber 6. In such a case intake port 39 is sealed by the valve member between the port slots 32 and 33. Assuming that the driver wishes to turn right, he gives the steering wheel that sort of an impulse which through pitman E carries the cylinder forward slightly with reference to the piston a distance indicated by the arc X in Figure 3. There being nothing to oppose its frictional engagement therewith, carrier sleeve 22 moves the same distance along with it until it abuts piston head 4. This brings port slot 32 into register with intake port 39 and pressure from the supply conduit is delivered to and built up in forward pressure chamber 30, exhaust port 40 being sealed at its inner end but exhaust port 41 for rear pressure chamber 31 being still open to piston chamber 15. This also terminates for the moment the necessary manual exertion on the steering wheel for the fluid pressure thereupon does the work reacting against piston head 4 and continuing the cylinder in its forward movement. Upon doing its work this pressure is built up sufficiently to act directly upon valve member 26 in overcoming the friction of its carrier and closing again the intake port 39. At any rate, exhaust port 40 is thereupon opened into piston chamber 15 and pressure chamber 30 is relieved, as earlier described, so that the two pressure chambers reassume a balance. Valve 26 is very sensitive and the pressure builds up very rapidly in chamber 30. Hence, even though the communication 39—32—35 from the incoming fluid is quickly cut off, the valve member continues to move to the right in Figure 7 until the groove 40 establishes communication between 15 and 30. In the meantime, bore 29 and its rear port 34 have been sealed by piston head 5 while the exhaust port for rear pressure chamber 21 has been continuously in communication with piston chamber 15 to relieve any pressure on piston head 5 due to compression therein. The extreme combined manual and fluid pressure actuation of the cylinder and the restoration of the valve and valve carrier to normal is illustrated in Figure 4. It may be here explained that at no time can the pressure in either pressure chamber be so raised and maintained as to cause the piston to contact either cylinder head. An extreme is shown in Figure 4. This is because the cylinder is made longer than any possible throw of the pitman E. Also, the frictional resistance of the valve and valve carrier is set to succumb to a predetermined pressure, say about 90 pounds, and it builds up very rapidly in the pressure chamber. Also, inasmuch as the pneumatic couple, it will be borne in mind, is working against a worm and segment gear G—F, it cannot itself operate the steering mechanism or cause any resistance to the driver. The latter simply turns the wheel lightly as long as he wants to turn the ground wheels and then holds it steady, whereupon the above described automatic release of the valve will occur. At no time is he required to turn the wheel more than the arc X and that at a time when it does not meet with resistance from the couple. The pressure is built up so rapidly that the valve "pops" at practically the instant the steering wheel is held stationary.

In fact, the valve will keep "popping" back and forth on slight curves in open driving where the manual effort is so small that it is not worthwhile calling in the booster, the many right angle turns required in city driving or in traffic being where the device is most appreciated. Therefore, in open driving the booster can be temporarily thrown out of operation by turning a valve M in the pressure line L arranged conveniently to the driver, as indicated in Figure 1.

It will be seen that when a reverse turn is initiated by the driver, namely, one to the left, the same thing happens in reverse with pressure chamber 31 activating. The steering gear having urged the cylinder 1 rearwardly, port 37 and slot 34 move to the open beyond the piston head 5, as shown in Figure 8, while the intake slot 33 for bore 29 comes into register with intake port 39. Chamber 30 is exhausting through 40 into piston chamber 15 while the pressure from the supply conduit 18 is moving through the bore 29 and out at 37—34 into pressure chamber 31. From there the expansion in the pressure chamber acts as before.

Of course, it will be obvious to those skilled in the art that our device may be operated through reversal by vacuum instead of positive pressure, vacuum, of course, being merely negative pressure. In other words, and in general, by forcibly exhausting, the atmosphere to the extent of its weight can be utilized as the positive pressure medium. In such a case, in general, opening 13 would communicate with the vacuum while conduit 18 would communicate the atmospheric pressure.

Our invention is particularly useful in connection with the large vehicles such as heavy duty trucks, tractors and passenger buses, the steering of which by manually operated means alone is an exhausting as well as a relatively slow procedure.

We claim as our invention:

1. In a fluid pressure actuator, the combination with a pneumatic couple comprising a cylinder and a two-headed piston operating therein with a chamber between the piston heads, and a tubular piston rod acting as an exhaust and extending from the piston chamber through the piston and through a head of the cylinder, the cylinder and the piston rod being adapted for connection, one with a fixed part and the other with the element to be actuated, of a frictional valve carrier within the piston chamber so engaging the cylinder walls between the piston heads, a reciprocatable valve member in the carrier extending through and reciprocatable in both piston heads, and a tubular pressure supply conduit extending through the piston rod, certain of the aforementioned parts being respectively provided with the following, namely, an exhaust port leading from the piston chamber to the piston rod, an exhaust port leading from the latter to the atmosphere, an intake port leading from the pressure supply conduit through the piston to the valve member, ports in the latter alternately respectively communicating such pressure to the pressure chamber between one or another piston head and the adjacent cylinder head, and ports in the said valve member adapted to alternately communicate exhaust from an opposite pressure chamber between a piston head and cylinder head and leading into the piston chamber.

2. In a fluid pressure actuator, the combination with a pneumatic couple comprising a cylinder and a two headed piston operating therein with a chamber between the piston heads, and a tubular piston rod acting as an exhaust and extending from the piston chamber through the piston and through a head of the cylinder, the cylinder and the piston rod being adapted for connection, one with a fixed part and the other with the element to be actuated, of a frictional valve carrier within the piston chamber so engaging the cylinder walls between the piston heads, a reciprocatable valve member in the carrier extending through and reciprocatable in both piston heads, a tubular pressure supply conduit extending through the piston rod, certain of the aforementioned parts being respectively provided with the following, namely, an exhaust port leading from the piston chamber to the piston rod, an exhaust port leading from the latter to the atmosphere, an intake port leading from the pressure supply conduit through the piston to the valve member, ports in the latter alternately respectively communicating such pressure to the pressure chamber between one or another piston head and the adjacent cylinder head and ports in the said valve member adapted to alternately communicate exhaust from an opposite pressure chamber between a piston head and cylinder head and leading into the piston chamber, and manually controllable means for initiating movement of the cylinder in either direction to shift the valve carrier and valve member relatively to the piston.

3. A fluid pressure actuator in accordance with the combination of claim 1 in which the valve carrier comprises a split sleeve provided with a plurality of expanding springs exerting the frictional pressure against the cylinder walls.

4. A fluid pressure actuator in accordance with the combination of claim 1 in which the valve carrier comprises a split sleeve provided with a plurality of expanding springs exerting the frictional pressure against the cylinder walls and the ends of which sleeve constitute stops cooperating with the piston heads to limit the movements of the valve member with reference thereto.

5. A fluid pressure actuator in accordance with the combination of claim 1 in which the valve carrier comprises a split sleeve and the valve member a cylinder extending through the sleeve and secured thereto.

6. A fluid pressure actuator in accordance with the combination of claim 1 in which the valve member comprises a cylinder having end faces of sufficient area to be sensitive to an ultimate pressure in either chamber and assist in operating the valve carrier to a neutral position.

7. A fluid pressure actuator in accordance with the combination of claim 1 in which the valve member comprises a cylinder having two longitudinal bores each of which has a port alternatively registering with the pressure supply conduit port and which respectively lead to the two pressure chambers.

8. A fluid pressure actuator in accordance with the combination of claim 1 in which the valve member comprises a cylinder having longitudinal peripheral grooves constituting the exhaust ports, which grooves are longer than the piston heads through which the valve member extends, and are each adapted to be closed off by the piston heads in one position of the valve member and to establish communication between the adjacent pressure chamber and the piston chamber in the opposite position of the valve member.

9. In a fluid pressure actuator, the combination with a pneumatic couple comprising a movable cylinder and a relatively fixed two headed piston therein with an exhaust chamber between the piston heads communicating with the atmosphere, there being a pressure chamber between each piston head and the adjacent head of the cylinder, of a valve member extending longitudinally through both piston heads and into both pressure chambers to be secondarily operated by pressure built up in either, means under control of the valve member for supplying pressure to either pressure chamber, the valve member being provided with ports adapted to concomitantly exhaust the other pressure chamber into the piston chamber, and means for primarily moving the valve.

10. In a fluid pressure actuator, the combination with a pneumatic couple comprising a movable cylinder and a relatively fixed two headed piston therein with an exhaust chamber between the piston heads communicating with the atmosphere, there being a pressure chamber between each piston head and the adjacent head of the cylinder, of a valve member extending longitudinally through both piston heads and into both pressure chambers to be secondarily operated by pressure built up in either, means under control of the valve member for supplying pressure to either pressure chamber, the valve member being provided with ports adapted to concomitantly exhaust the other pressure chamber into the piston chamber, a carrier for the valve in the piston chamber frictionally engaging the cylinder to move therewith within the limits of said chamber and means for initially moving the cylinder in either direction.

11. In a fluid pressure actuator, the combination with a pneumatic couple comprising a movable cylinder and a relatively fixed two headed piston therein with an exhaust chamber between the piston heads communicating with the atmosphere, there being a pressure chamber between each piston head and the adjacent head of the cylinder, of a valve member extending longitudinally through both piston heads and into both pressure chambers to be secondarily operated by pressure built up in either, means under control of the valve member for supplying pressure to either pressure chamber, the valve member being provided with ports adapted to concomitantly exhaust the other pressure chamber into the piston chamber, an expanding sleeve in the piston chamber frictionally engaging the cylinder to move therewith within the limits of such chamber and to which sleeve the valve is fixed and manually operable means for moving the cylinder in either direction.

HENRY J. SCHNEIDER.
LEON G. SIMPSON.